United States Patent [19]

Admassu et al.

[11] Patent Number: 4,959,082
[45] Date of Patent: Sep. 25, 1990

[54] POLYCARBONATE GAS SEPARATION MEMBRANES CONTAINING SUBSTITUTED BENZENES AND PROCESSES FOR MAKING AND USING THE SAME

[75] Inventors: Wudneh Admassu, Concord; Daniel O. Clark, Benicia, both of Calif.

[73] Assignee: The Dow Chemical Company, Midland, Mich.

[21] Appl. No.: 383,952

[22] Filed: Jul. 20, 1989

[51] Int. Cl.$^5$ .................. B01D 53/22; B01D 71/50
[52] U.S. Cl. ............................... 55/16; 55/68; 55/70; 55/73; 55/158
[58] Field of Search .................. 55/16, 68, 158, 70, 55/71, 73

[56] References Cited

U.S. PATENT DOCUMENTS

| | | | |
|---|---|---|---|
| 3,119,787 | 1/1964 | Laakso et al. | |
| 3,256,675 | 11/1962 | Robb | 55/16 |
| 3,615,024 | 8/1968 | Michaels | |
| 3,890,266 | 6/1975 | Serini et al. | |
| 3,945,926 | 3/1976 | Kesting | 264/41 X |
| 4,032,309 | 6/1977 | Salemme | 55/158 |
| 4,075,108 | 2/1978 | Higley et al. | 264/41 X |
| 4,086,310 | 4/1978 | Bottenbruch et al. | 55/158 X |
| 4,120,098 | 10/1978 | Manos | 55/16 X |
| 4,195,157 | 3/1980 | Mark | 528/174 |
| 4,374,891 | 2/1983 | Ward, III | 428/220 |
| 4,472,175 | 9/1984 | Malon et al. | 55/16 |
| 4,486,202 | 12/1984 | Malon et al. | 55/158 |
| 4,575,385 | 3/1986 | Brooks et al. | 55/158 |
| 4,654,055 | 3/1987 | Malon et al. | 55/16 X |
| 4,715,960 | 12/1987 | Thompson | 210/651 |
| 4,728,346 | 3/1988 | Murphy | 55/158 |
| 4,764,320 | 8/1988 | Chau et al. | 55/16 X |
| 4,767,422 | 8/1988 | Bikson et al. | 55/16 |
| 4,772,392 | 9/1988 | Sanders et al. | 210/500.23 |
| 4,776,936 | 10/1988 | Smith et al. | 55/16 X |
| 4,789,386 | 12/1988 | Vaughn et al. | 55/16 |
| 4,806,189 | 2/1989 | Kraus et al. | 55/158 X |
| 4,818,254 | 4/1989 | Anand et al. | 55/158 X |
| 4,824,443 | 4/1989 | Matson et al. | 55/158 X |
| 4,828,585 | 5/1989 | Chiao | 55/16 |
| 4,851,014 | 7/1989 | Jeanes | 55/158 X |
| 4,859,215 | 8/1989 | Langsam et al. | 55/16 |

FOREIGN PATENT DOCUMENTS

| | | |
|---|---|---|
| 136621A | 9/1983 | European Pat. Off. |
| 58-8511 | 1/1983 | Japan |
| 58-223411A | 12/1983 | Japan |
| 529183 | 9/1976 | U.S.S.R. |
| 2011804A | 11/1978 | United Kingdom |

OTHER PUBLICATIONS

Jordan et al., "Characterization of $CO_2$-Induced Conditioning of Polycarbonate Films Using Penetrants with Different Solubilities", *Journal of Membrane Science*, vol. 43, 1989, pp. 103–120.

Barbari et al., "Polymeric Membranes Based on Bisphenol A for Gas Separations", *Journal of Membrane Science*, vol. 42, 1989, pp. 69–86.

Muruganandam, University of Texas at Austin, Separations Research Program, paper presented at fall meeting on Oct. 28 & 29, 1985, "Sorption and Transport in Substituted Polycarbonates and Polystyrene/Tetramethyl Polycarbonate Blends".

Muruganandam, "Evaluation of Substituted Polycarbonates and a Blend with Polystyrene as Gas Separation Membranes", *Journal of Membrane Science*, vol. 34, 1987, pp. 185–198.

Chern et al., Chapter 2, "Material Selection for Membrane Based Gas Separations", *Material Science of Synthetic Membranes*, Lloyd, Ed. pp. 25–46, American Chemical Society (1985).

*Primary Examiner*—Robert Spitzer

[57] ABSTRACT

This invention relates to improved semipermeable polycarbonate gas separation membranes containing substituted benzene(s), a method of using such membranes to separate gases, and a method of fabricating such membranes.

25 Claims, No Drawings

POLYCARBONATE GAS SEPARATION MEMBRANES CONTAINING SUBSTITUTED BENZENES AND PROCESSES FOR MAKING AND USING THE SAME

BACKGROUND OF THE INVENTION

This invention relates to polycarbonate membranes containing substituted benzenes which interact with the polycarbonate polymer to enhance the gas separation performance of said membranes. The invention further relates to a process for fabricating said polycarbonate gas separation membranes containing substituted benzenes. The invention also further relates to a process of gas separation using said membranes.

The use of polymeric membranes for gas separation is well known. A wide variety of polymers has been used for gas separation membranes, including cellulose esters, polyamides, polyimides, polysulfones, and polyolefins. Gases successfully separated from gas mixtures by membranes include hydrogen, helium, oxygen, nitrogen, carbon monoxide, carbon dioxide, hydrogen sulfide, water vapor, ammonia, and/or light hydrocarbons such as methane, ethane, ethylene, propane, propylene, butane, butylene, etc. An application of particular interest is membrane separation of oxygen and nitrogen from air. An enriched nitrogen stream obtained from air may be used for inert padding of flammable fluids or for food storage. An enriched oxygen stream obtained from air may be used for enhancing combustion or for increasing the efficiency of fermentation processes. Additional applications of interest include membrane separation of hydrogen from gas mixtures containing other gases such as nitrogen, carbon monoxide, carbon dioxide, water vapor, hydrogen sulfide, ammonia, and/or light hydrocarbons, which are formed in various hydrocracker, hydrotreater, and catalytic reformer processes used in the oil refinery industry.

Such membrane separations are based on the relative permeability of two or more gaseous components through the membrane. To separate a gas mixture into two portions, one richer and one leaner in at least one component, the gas mixture is brought into contact with one side of a semi-permeable membrane through which at least one of the gaseous components selectively permeates. A gaseous component which selectively permeates through the membrane passes through the membrane more rapidly than at least one other component of the gas mixture. The gas mixture is thereby separated into a stream which is enriched in the selectively permeating component or components and a stream which is depleted in the selectively permeating component or components. The stream which is depleted in the selectively permeating component or components is enriched in the relatively non-permeating component or components. A relatively non-permeating component passes through the membrane more slowly than at least one other component of the gas mixture. An appropriate membrane material is chosen for the gas mixture so that some degree of separation of the gas mixture can be achieved.

Polycarbonate membranes in particular have been discovered to possess good separation properties for gases, especially oxygen and nitrogen. Polycarbonate membranes possess good mechanical properties and are able to operate under extreme conditions of temperature and pressure. However, polycarbonate membranes sometimes possess lower gas flux or permeability or gas selectivity than desired for certain applications. A method of substantially increasing the gas flux or permeability and/or gas selectivity of such membranes without significantly decreasing the mechanical strength of such membranes is needed.

SUMMARY OF THE INVENTION

What has now been discovered is semi-permeable gas separation membrane comprising a thin discriminating layer of a polycarbonate polymer containing at least one substituted benzene in an amount effective to interact with the polycarbonate polymer and increase the gas flux and/or gas selectivity of the membrane by at least about 10 percent without causing a significant decrease in the tensile strength of the membrane.

The invention also is a process for fabricating a semi-permeable gas separation membrane comprising the steps of:

A. contacting at least one side of a semipermeable polycarbonate gas separation membrane with a treatment fluid containing at least one substituted benzene under conditions such that an effective amount of the substituted benzene(s) is absorbed into the membrane and interacts with the polycarbonate polymer to increase the gas flux and/or gas selectivity of the membrane by at least about 10 percent without causing a significant decrease in the tensile strength of the membrane.

The treatment fluid may be a liquid or a vapor.

The invention is also a process for separating gases using said membrane comprising:

A. contacting one side of a semi-permeable membrane with a feed gas mixture under pressure, wherein the membrane divides a separation chamber into a high pressure side into which the feed gas mixture is fed and a low pressure side;

B. maintaining a pressure differential across the membrane under conditions such that at least one component of the gas mixture selectively permeates through the membrane from the high pressure side to the low pressure side of the membrane;

C. removing from the low pressure side of the membrane permeated gas which is enriched in at least one faster permeating component of the gas mixture; and D. removing from the high pressure side of the membrane non-permeated gas which is depleted in at least one faster permeating component of the gas mixture;

wherein the membrane comprises a thin discriminating layer of a polycarbonate polymer containing at least one substituted benzene in an amount effective to interact with the polycarbonate polymer and increase the gas flux and/or gas selectivity of the membrane by at least about 10 percent without causing a significant decrease in the tensile strength of the membrane.

The polycarbonate membranes of this invention possess increased gas flux and/or gas selectivity compared with polycarbonate membranes which do not contain substituted benzene(s). The membranes of this invention possess good mechanical strength and may be operated under high temperatures and pressures.

DETAILED DESCRIPTION OF THE INVENTION

The polycarbonate membranes of the present invention may be any semi-permeable polycarbonate gas separation membrane containing an effective amount of at least one substituted benzene. The membranes of this invention are preferably fabricated from polycarbonates which are derived from bisphenols. The polycarbonates of this invention preferably are derived in a significant portion from bisphenols which possess substituents on the phenolic rings. Preferably, at least about 25 percent of the bisphenols in the polycarbonate backbone possess substituents on the phenolic rings; more preferably at least about 50 percent of the bisphenols in the polycarbonate backbone possess substituents on the phenolic rings; even more preferably at least about 75 percent of the bisphenols in the polycarbonate backbone possess substituents on the phenolic rings. Preferably the bisphenols used to prepare the polycarbonates are tetra-substituted. The substituents are preferably located at the 3,5 positions on the phenolic rings.

The polycarbonates useful in this invention preferably comprise polymers with backbone units corresponding to Formula 1:

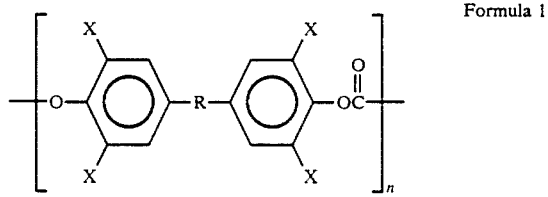

Formula 1 wherein
- R is independently in each occurrence —CO—, —S—, —SO$_2$—, —O—, a C$_{1-6}$ divalent hydrocarbon radical, an inertly substituted C$_{1-6}$ divalent hydrocarbon radical, or a C$_{1-6}$ divalent halocarbon radical;
- X is independently in each occurrence hydrogen, a halogen, a C$_{1-4}$ alkyl, or a C$_{1-4}$ haloalkyl; and
- n is a positive real number of about 20 or greater.
- R is preferably a C$_{1-6}$ divalent hydrocarbon, more preferably a C$_{1-6}$ alkylidene radical, most preferably an isopropylidene radical. X is preferably hydrogen, chlorine, bromine, fluorine, or methyl. n is preferably a positive real number of about 35 or greater. An especially preferred bisphenol of Formula 1 useful in this invention is 2,2-bis(3,5-bromo-4-hydroxyphenyl)propane(tetrabromobisphenol A polycarbonate).

Methods of synthesizing such polycarbonates are well known in the art. See U.S. Pat. Nos. 3,038,874; 3,119,787; 3,153,008; 3,248,366; 3,334,154; 3,409,704; 3,829,266; 3,912,687; and 4,413,103; the relevant portions incorporated herein by reference. See also *Encyclopedia of Polymer Science*, Interscience Division of John Wiley and Sons, N.Y., N.Y., 1969, Vol. 10, pp. 714–725, the relevant portions incorporated herein by reference.

The polycarbonate membranes which may be treated by the inventive process may be manufactured by methods known in the art. Such membranes may be fabricated in the form of flat sheets, hollow tubes, or hollow fibers. One preferred method of producing such membranes is to extrude a blend of the polymer, a solvent, and a non-solvent. An example of a preferred solvent is N-methylpyrrolidone. An example of a preferred non-solvent is triethylene glycol. The blend preferably contains from about 30 to about 60 weight percent polymer. The preferred solvent/non-solvent ratio is between about 1.7 and about 5.1. The blend is extruded, immersed in a water quench bath, then optionally leached and annealed in water. A further description of the preferred extrusion process, including preferred solvents and non-solvents, is contained in U.S. Pat. No. 4,772,392, the relevant portions incorporated herein by reference.

Following manufacture, the polycarbonate membranes usually contain residual solvent and nonsolvent. For example, polycarbonate membranes formed by the process described in U.S. Pat. No. 4,772,392, generally contain from about 0.5 to about 3.0 weight percent residual solvent and non-solvent as extruded. The presence of substantial residual solvent and non-solvent in the membranes may adversely affect membrane performance. Therefore, significant residual solvent and non-solvent in the membranes are preferably removed prior to treating the membranes with the inventive process disclosed herein.

The membranes treated by the inventive process disclosed herein may be dry or wet. The membranes may optionally be dried prior to treatment by the inventive process by any method known in the art including the alcohol pretreatment drying method disclosed in U.S. patent application Ser. No. 192,275, filed May 10, 1988, now U.S. Pat. No. 4,843,733, the relevant portions incorporated herein by reference, or by the water pretreatment and annealing drying method disclosed in co-pending U.S. patent application Ser. No. 269,922, filed Nov. 9, 1988, now U.S. Pat. No. 4,900,334, the relevant portions incorporated herein by reference. The membranes may alternatively be directly dried in air without any pre-drying treatment.

The polycarbonate membranes hereinbefore described are treated with at least one substituted benzene present in treatment vapor or aqueous treatment solutions. The substituted benzenes useful in this invention preferably possess a boiling point of at least about 100° C., more preferably of at least about 120° C. Substituted benzenes preferred for use in this invention include those of Formula 2:

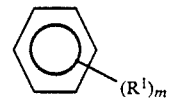

wherein R$^1$ is independently in each occurrence hydrogen, hydroxy, a halogen, a C$_{1-4}$ alkyl, a C$_{1-4}$ haloalkyl, a C$_{1-4}$ alkoxy, or nitro; and m is an integer between 1 and 6 inclusive. R$^1$ is preferably independently in each occurrence hydrogen, hydroxy, chlorine, bromine, methyl, ethyl, n-propyl, iso-propyl, a C$_{1-4}$ chloroalkyl, a C$_{1-4}$ bromoalkyl, or nitro; R$^1$ is more preferably independently in each occurrence hydrogen, hydroxy, chlorine, bromine, methyl, ethyl, or nitro. m is preferably an integer between 1 and 4 inclusive, m is more preferably an integer between 1 and 3 inclusive. The polycarbonate membranes useful in this invention may be treated with the substituted benzene(s) before or after fabricating the membranes into devices.

In the embodiment wherein the polycarbonate membranes useful in this invention are treated with an aqueous treatment solution containing substituted benzene(s), at least one side of the polycarbonate membrane is contacted with the aqueous solution under conditions such that the substituted benzene(s) is absorbed into the membrane in an amount effective to interact with the polycarbonate polymer and to preferably increase the gas flux and/or gas selectivity of the membrane by at least about 10 percent, more preferably by at least about 20 percent, even more preferably by at least 30 percent, without significantly decreasing the mechanical strength of the membrane compared with untreated membranes. The substituted benzene(s) is preferably present in the aqueous solution in an amount of between about 50 and about 10,000 ppmv, more preferably between about 100 and about 5,000 ppmv, even more preferably between about 100 and about 1,000 ppmv. The membrane is contacted with the aqueous solution for a time sufficient to absorb an effective amount of the substituted benzene(s) into the membrane. The contact time is preferably between about 0.1 and about 24 hours, more preferably between about 5 and about 6 hours, even more preferably between about 1 and about 4 hours. The treatment temperature may be any temperature at which absorption of the substituted benzene(s) into the membrane occurs at a reasonable rate and which does not deleteriously affect the membrane. Preferred treatment temperatures are between about 5 and about 60° C., more preferably between about 15 and about 40° C., even more preferably between about 20 and about 30° C.

Following treatment with the aqueous solution containing substituted benzene(s), the membrane is preferably dried. The membrane is dried by exposing the membrane to air, an inert gas, a vacuum, or a combination thereof for a sufficient time at a sufficient temperature to dry the membrane. The membrane may be dried at any temperature at which drying occurs at a reasonable rate and which does not deleteriously affect the treated membrane. The maximum drying temperature is also preferably below the boiling of the substituted benzene(s) absorbed into the membrane. The drying temperature is preferably between about 5 and about 90° C., more preferably between about 15° and about 60° C., even more preferably between about 20° and about 40° C. The drying time is preferably between about 0.5 and about 6 hours, more preferably between about 1 and about 4 hours. Following drying, the membrane preferably contains less than about 1 weight percent water.

In an alternate treatment process, at least one side of the polycarbonate membrane is exposed to vapor containing at least one substituted benzene under conditions such that the polycarbonate membrane absorbs the substituted benzene(s) in an amount effective to interact with the polycarbonate polymer and preferably increase the gas flux and/or gas selectivity of the membrane by at least about 10 percent, more preferably by at least about 20 percent, even more preferably by at least about 30 percent, without significantly decreasing the mechanical strength of the membrane. The substituted benzene(s) is preferably present in the exposure vapor in an amount between about 50 and about 10,000 ppmv, more preferably between about 100 and about 5,000 ppmv, even more preferably between about 100 and about 1,000 ppmv. The exposure time is preferably between about 1 and about 240 minutes, more preferably between about 5 and about 120 minutes. The exposure temperature may be any temperature at which absorption of the substituted benzene(s) into the membrane occurs at a reasonable rate and which does not deleteriously affect the membrane. Preferred exposure temperatures are between about 5° and about 90° C., more preferably between about 15° and about 60° C., even more preferably between about 20° and about 40° C.

The membranes of this invention contain at least one substituted benzene in an amount effective to interact with the polycarbonate polymer and preferably increase the gas flux and/or gas selectivity of the membrane by at least about 10 percent, more preferably by at least about 20 percent, even more preferably by at least about 30 percent, without significantly decreasing the tensile strength of the membrane compared with untreated polycarbonate membranes. Preferably the treatment with substituted benzene(s) results in less than about a 10 percent decrease in tensile strength compared with untreated membranes. The substituted benzene(s) present in the membrane may be uniformly or nonuniformly dispersed throughout the membrane, depending upon the nature of the interaction of the substituted benzene with the polycarbonate polymer. The substituted benzene(s) is preferably present in the membrane at a level of between about 10 and about 20,000 ppm, more preferably between about 50 and about 10,000 ppm, even more preferably between about 100 and about 7,500 ppm.

The membranes treated by the inventive process and containing substituted benzene(s) are contained within spiral wound, tubular, or hollow fiber devices by methods known in the art. See U.S. Pat. Nos. 3,228,876; 3,422,008; 3,455,360; 3,475,331; 3,526,001; 3,528,553; 3,690,465; 3,702,658; 3,755,034; 3,801,401; 4,271,900; 3,872,014; 3,966,616; 4,045,851; 4,061,574; 4,080,296; 4,083,780; 4,220,535; 4,235,723; 4,265,763; 4,315,819; 4,430,219; 4,351,092; 4,367,139; 4,666,469; 4,707,267; 4,752,305; and 4,758,341, the relevant portions incorporated herein by reference. The membranes are used to isolate or recover gases from gaseous mixtures. When mounted in a gas separation device so as to provide two regions separated by the membrane, one side of the membrane is contacted with a feed gas mixture under pressure, while a pressure differential is maintained across the membrane. At least one of the components in any given gas mixture selectively permeates through the membrane more rapidly than the other components. A stream is obtained on the low pressure side of the membrane which is enriched in at least one faster permeating component. The permeated gas is removed from the low pressure (downstream side) of the membrane. A stream depleted in at least one faster permeating component is withdrawn from the high pressure (upstream) side of the membrane.

The membranes of this invention are of particular use in the separation of oxygen and nitrogen from air. In such embodiments, oxygen selectively permeates through the membrane more rapidly than nitrogen. The membranes are also of particular use in the separation of hydrogen from gas mixtures containing other gases such as nitrogen, carbon monoxide, carbon dioxide, water vapor, hydrogen sulfide, and/or light hydrocarbons. In such embodiments, hydrogen selectively permeates through the membrane. As used herein, the term light hydrocarbons refers to gaseous saturated and unsaturated $C_{1-4}$ hydrocarbons including methane, ethane, ethylene, propane, propylene, butane, and butylene. The membrane separation process is carried out at pressures and temperatures which do not deleteriously affect the membranes. Preferably the feed pressure is between about 25 and about 1,000 psig, more preferably between about 50 and about 500 psig, even more preferably between about 50 and about 200 psig. The feed temperature is preferably between about 5 and about 150° C., more preferably between about 10° and about 100° C., even more preferably between about 15° and about 80° C. In the preferred embodiment wherein the membrane is a hollow fiber, the feed gas mixture may be introduced on the outside or the inside of the hollow fiber. The membranes of this invention may be treated with the substituted benzene(s) during operation by introducing an effective amount of vapor containing the substituted benzene(s) into the feed gas to the membrane under the conditions previously described for vapor treatment.

Gas permeability is defined as $$P = \frac{(\text{amount of permeate})(\text{membrane thickness})}{(\text{area})(\text{time})(\text{driving force gradient across the membrane})}.$$

A standard permeability unit is the Barrer, which is equal to $$\frac{(\text{centimeter})^3 \, (STP) \, (\text{centimeter})}{(\text{centimeter})^2 \, (\text{second}) \, (\text{centimeter Hg})} \times 10^{-10},$$

where STP stands for standard temperature and pressure, abbreviated hereinafter as $$\frac{cm^3 \, (STP) \, cm}{cm^2 \, s \, cmHg} \times 10^{-10}.$$

The gas flux is defined as (permeability)÷(membrane thickness). A standard gas flux unit is $$10^{-6} \frac{(\text{centimeter})^3 \, (STP)}{(\text{centimeter})^2 \, (\text{second}) \, (\text{centimeter Hg})}$$

abbreviated hereinafter as $$10^{-6} \frac{cm^3 \, (STP)}{cm^2 \, s \, cmHg}.$$

The gas separation factor (gas selectivity) is the ratio of the permeability or gas flux of the faster permeating gas to the permeability or gas flux of the slower permeating gas.

In the embodiment wherein oxygen is separated from nitrogen, the polycarbonate membranes of this invention preferably have a separation factor for oxygen/nitrogen of at least about 5.5, more preferably at least about 6.5, even more preferably of at least about 7.0. The flux of oxygen is preferably at least about $$7 \times 10^{-6} \frac{cm^3 \, (STP)}{cm^2 \, s \, cmHg},$$

more preferably at least about $$9 \times 10^{-6} \frac{cm^3 \, (STP)}{cm^2 \, s \, cmHg}.$$

In the embodiment wherein hydrogen is separated from light hydrocarbons, the polycarbonate membranes of this invention preferably have a separation factor for hydrogen/light hydrocarbons of at least about 25, more preferably at least about 50. The flux of hydrogen is preferably at least about $$1 \times 10^{-5} \frac{cm^3 \, (STP)}{cm^2 \, s \, cmHg},$$

more preferably at least about $$1 \times 10^{-4} \frac{cm^3 \, (STP)}{cm^2 \, s \, cmHg}.$$

The membranes of this invention may be used to separate gas mixtures by combining the membranes with cryogenic and/or pressure swing absorption processes.

SPECIFIC EMBODIMENTS

The following Examples are for illustration only and are not intended to limit the scope of the invention or Claims.

EXAMPLE 1

Hollow fibers are extruded from an extrusion blend containing about 52 percent tetrabromobisphenol A polycarbonate (TBBA-PC), about 33 percent N-methylpyrrolidone (NMP), and about 15 percent tetrethylene glycol (TEG) by weight as described in U.S. Pat. No. 4,772,392, the relevant portions incorporated herein by reference. Some samples of the fibers are then dried in air at room temperature for about 2 hours.

Samples of the wet and dry fibers are treated by soaking the fibers in an aqueous solution containing about 100–1,000 ppm toluene at room temperature for about 2 hours. The fibers are then dried in air at room temperature for about 2 hours. The fibers are stored for about 105 days and then analyzed for toluene concentration and residual NMP and TEG concentration by gas chromatography using a flame ionization detector with an internal or external standard. A fused silica capillary column obtained from J.N.W. Scientific, Inc. under the product designation DB5 is used. The injection sample is prepared by dissolving a portion of the membrane in methylene chloride. The polymer in the resulting solution is optionally precipitated from the solution with alcohol prior to injecting the sample into the gas chromatograph in order to prevent fouling of the column. Toluene, NMP, and TEG concentrations for the treated fibers are listed in Table I and compared to NMP and TEG concentrations for an untreated control sample. Even after 105 days of storage, the treated fibers still contain about 0.16 weight percent toluene.

TABLE I

| Sample | Concentration (weight percent) | | |
|---|---|---|---|
| | Toluene | NMP | TEG |
| Control | N/A | 1.12 | 0.13 |
| Dry/Toluene | 0.165 | 1.12 | 0.13 |
| Wet/Toluene | 0.157 | 1.11 | 0.10 |

EXAMPLE 2

Hollow fibers are fabricated from tetrabromobisphenol A polycarbonate as described in Example 1. Some samples of the wet fibers are immersed in aqueous solutions containing about 500 ppm and 1,000 ppm toluene respectively for about 2 hours at room temperature.

The fibers are then dried at room temperature for about 2 hours. The fibers are fabricated into test cells and tested for gas flux on single gas feed at room temperature and about 50 psig continuously for about 3 hours, 24 hours, 5 days, and 10 days respectively. At the end of each test period, some of the test cells are dismantled and the fiber used to evaluate toluene concentration and residual NMP and TEG concentrations by the method of Example 1. Data are shown in Table II. The toluene-containing samples possess increased gas flux compared with the untreated control samples. Even after 10 days on continuous testing under pressure, the fibers contain a significant amount of toluene and enhanced gas flux compared to the untreated control samples. The untreated control samples and the toluene-containing samples exhibited about the same compaction rate. (Compaction rate is the decline in flux experienced by the membrane as the membrane compacts or densifies under normal operating conditions, which is accompanied by an increase in separation factor.)

TABLE II

| Sample | Oxygen Flux $10^{-6} \frac{cm^3 (STP)}{cm^2 S\ cmHg}$ | Oxygen/Nitrogen Separation Factor | Concentration (weight percent) Toluene | NMP | TEG |
| --- | --- | --- | --- | --- | --- |
| 3 hours | | | | | |
| Control | 6.91 | 6.96 | N/A | 1.64 | 0.196 |
| 500 ppm | 9.56 | 7.18 | 0.111 | 1.32 | 0.015 |
| 1000 ppm | 10.32 | 7.06 | 0.150 | 1.23 | 0.027 |
| 24 hours | | | | | |
| Control | | | N/A | — | — |
| 500 ppm | | | 0.084 | 1.14 | — |
| 1000 ppm | | | 0.180 | 1.16 | — |
| 5 days | | | | | |
| Control | | | N/A | — | — |
| 500 ppm | | | 0.74 | 1.24 | — |
| 1000 ppm | | | 0.147 | 1.15 | — |
| 10 days | | | | | |
| Control | 5.35 | 6.29 | N/A | 1.68 | — |
| 500 ppm | 7.28 | 7.49 | 0.055 | 1.22 | — |
| 1000 ppm | 7.93 | 7.28 | 0.109 | 1.28 | — |

EXAMPLE 3

Hollow fibers are fabricated from tetrabromobisphenol A polycarbonate as described in Example 1. The fibers are then soaked in water at room temperature for about 5 days, flushed with water at about 60° C. for about 3 hours, dried in air at about 60° C. for about 4 hours, and heat treated at about 60° C. for about 24 hours. Some of the fibers are then exposed to an air flow of about 540 ft3/hour containing about 1,000 ppm toluene for about 0.5, 1, and 2 hours respectively at room temperature. The fibers are fabricated into test cells and tested for gas flux on single gas feed at room temperature and about 50 psig. The test cells are then dismantled and the fibers used to determine toluene and NMP concentrations. Data is shown in Table III.

TABLE III

| Sample | Oxygen Flux $10^{-6} \frac{cm^3 (STP)}{cm^2 S\ cmHg}$ | Oxygen/Nitrogen Separation Factor | Concentration Toluene (ppm) | NMP (weight percent) |
| --- | --- | --- | --- | --- |
| Control | 14.2 | 6.99 | — | 0.360 |
| 0.5 hr | 10.2 | 7.76 | 7,300 | 0.337 |
| 1 hr | 9.78 | 7.75 | 7,500 | 0.327 |
| 2 hr | 10.8 | 7.72 | 5,000 | 0.280 |

What is claimed is:

1. A process for separating gases using a semi-permeable gas separation membrane comprising:
    A. contacting one side of a semi-permeable membrane with a feed gas mixture under pressure, wherein the membrane divides a separation chamber into a high pressure side into which the feed gas mixture is fed and a low pressure side;
    B. maintaining a pressure differential across the membrane under conditions such that at least one component of the gas mixture selectively permeates through the membrane from the high pressure side to the low pressure side of the membrane;
    C. removing from the low pressure side of the membrane permeated gas which is enriched in at least one faster permeating component of the gas mixture; and
    D. removing from the high pressure side of the membrane non-permeated gas which is depleted in at least one faster permeating component of the gas mixture;

wherein the membrane comprises a thin discriminating layer of a polycarbonate gas separation membrane containing at least one substituted benzene in an amount effective to interact with the polycarbonate polymer and increase the gas flux and/or gas selectivity of the membrane by at least about 10 percent without causing a significant decrease in the tensile strength of the membrane.

2. The process of claim 1 wherein the feed gas contains at least one gas selected from the group consisting of hydrogen, helium, oxygen, nitrogen, carbon monoxide, carbon dioxide, hydrogen sulfide, water vapor, ammonia, and/or light hydrocarbons.

3. The process of claim 2 wherein the feed gas pressure is between about 25 and about 1,000 psig.

4. The process of claim 3 wherein the feed gas temperature is between about 5° and about 150° C.

5. A semi-permeable gas separation membrane comprising a thin discriminating layer of a polycarbonate polymer containing at least one substituted benzene in an amount effective to interact with the polycarbonate polymer and increase the gas flux and/or gas selectivity of the membrane by at least about 10 percent without causing a significant decrease in the tensile strength of the membrane.

6. The membrane of claim 5 wherein the polycarbonate is comprised of backbone units corresponding to the formula:

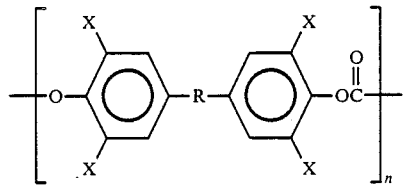

wherein
R is independently in each occurrence —CO—, —S—, —SO$_2$—, —O—, a C$_{1-6}$ divalent hydrocarbon radical, an inertly substituted C$_{1-6}$ divalent hydrocarbon radical, or a C$_{1-6}$ divalent halocarbon radical;
X is independently in each occurrence hydrogen, a halogen, a C$_{1-4}$ alkyl, or a C$_{1-4}$ haloalkyl; and
n is a positive real number of about 20 or greater.

7. The membrane of claim 6 wherein the substituted benzene possesses a boiling point of at least about 100° C. and corresponds to the formula:

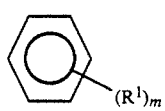

wherein $R^1$ is independently in each occurrence hydrogen, hydroxy, a halogen, a $C_{1-4}$ alkyl, a $C_{1-4}$ haloalkyl, a $C_{1-4}$ alkoxy, or nitro, and m is an integer between 1 and 6, inclusive.

8. The membrane of claim 7 wherein R is a C1-6 divalent hydrocarbon radical; and X is hydrogen, chlorine, bromine, fluorine, or methyl.

9. The membrane of claim 8 wherein at least about 25 percent of the bisphenol residues present in the polycarbonate backbone are tetra-substituted.

10. The membrane of claim 9 wherein the membrane contains between about 10 and about 20,000 ppm of the substituted benzene(s).

11. The membrane of claim 10 wherein the polycarbonate membrane is asymmetric or composite.

12. The membrane of claim 11 wherein the membrane is a hollow fiber.

13. The membrane of claim 12 wherein the polycarbonate is 2,2-bis(3,5-dibromo-4-hydroxyphenyl)propane.

14. The membrane of claim 13 wherein the polycarbonate membrane possesses a separation factor for oxygen/nitrogen of at least about 5.5.

15. The membrane of claim 14 wherein the polycarbonate membrane possesses an oxygen flux of at least about $$7 \times 10^{-6} \frac{cm^3 \ (STP)}{cm^2 \ sec \ cmHg}.$$

16. A process for fabricating a semi-permeable gas separation membrane comprising the steps of:
  A. contacting at least one side of a semipermeable polycarbonate gas separation membrane with treatment fluid containing at least one substituted benzene under conditions such that an effective amount of the substituted benzene(s) is absorbed into the membrane and interacts with the polycarbonate polymer to increase the gas flux and/or gas selectivity of the membrane by at least about 10 percent without causing a significant decrease in the tensile strength of the membrane.

17. The process of claim 16 wherein the polycarbonate comprises a polymer corresponding to the formula:

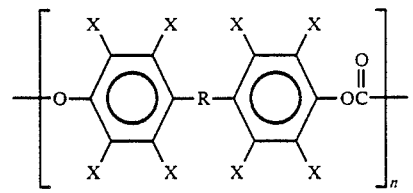

wherein
  R is independently in each occurrence —CO—, —S—, —SO₂—, —O—, a $C_{1-6}$ divalent hydrocarbon radical, an inertly substituted $C_{1-6}$ divalent hydrocarbon radical, or a $C_{1-6}$ divalent halocarbon radical;
  X is independently in each occurrence hydrogen, a halogen, a $C_{1-4}$ alkyl, or a $C_{1-4}$ haloalkyl; and
  n is a positive real number of about 20 or greater.

18. The process of claim 17 wherein the substituted benzene possesses a boiling point of at least about 100° C. and corresponds to the formula:

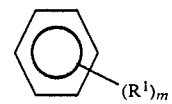

wherein $R^1$ is independently in each occurrence hydrogen, hydroxy, a halogen, a $C_{1-4}$ alkyl, a $C_{1-4}$ haloalkyl, a $C_{1-4}$ alkoxy, or nitro and m is an integer between 1 and 6, inclusive.

19. The process of claim 18 wherein the treatment fluid comprises water.

20. The process of claim 19 comprising the further step of:
  B. contacting at least one side of the membrane with air, an inert gas, a vacuum, or a combination thereof under conditions such that substantially all of the water is removed from the membrane while the membrane retains an effective amount of the substituted benzene(s) without deleteriously affecting the physical integrity of the membrane.

21. The process of claim 20 wherein the substituted benzene(s) is present in the aqueous solution in an amount between about 50 and 10,000 ppmv.

22. The process of claim 21 wherein the treatment temperature is between about 5° and about 60° C.

23. The process of claim 18 wherein the treatment fluid is a vapor.

24. The process of claim 23 wherein the substituted benzene(s) is present in the vapor in an amount between about 50 and about 10,000 ppmv.

25. The process of claim 24 wherein the treatment temperature is between about 5° and about 90° C.

* * * * *